(12) United States Patent
Veilleux, Jr. et al.

(10) Patent No.: US 9,874,208 B2
(45) Date of Patent: Jan. 23, 2018

(54) BEARING FACES WITH FLUID CHANNELS FOR GEAR PUMPS

(71) Applicant: Hamilton Sundstrand Corporation, Charlotte, NC (US)

(72) Inventors: Leo J. Veilleux, Jr., Wethersfield, CT (US); Lubomir A. Ribarov, West Hartford, CT (US)

(73) Assignee: Hamilton Sunstrand Corporation, Charlotte, NC (US)

( * ) Notice: Subject to any disclaimer, the term of this patent is extended or adjusted under 35 U.S.C. 154(b) by 361 days.

(21) Appl. No.: 14/601,511

(22) Filed: Jan. 21, 2015

(65) Prior Publication Data

US 2016/0208611 A1   Jul. 21, 2016

(51) Int. Cl.
| | |
|---|---|
| *F04C 2/18* | (2006.01) |
| *B23K 26/34* | (2014.01) |
| *F16C 33/14* | (2006.01) |
| *F16C 17/04* | (2006.01) |
| *F16C 35/02* | (2006.01) |

(52) U.S. Cl.
CPC .............. *F04C 2/18* (2013.01); *B23K 26/34* (2013.01); *F16C 33/14* (2013.01); *F04C 2230/91* (2013.01); *F04C 2240/56* (2013.01); *F05C 2201/0412* (2013.01); *F05C 2201/0448* (2013.01); *F05C 2201/0475* (2013.01); *F05C 2201/0484* (2013.01); *F16C 17/04* (2013.01); *F16C 35/02* (2013.01); *F16C 2220/24* (2013.01); *F16C 2237/00* (2013.01)

(58) Field of Classification Search
CPC ..... F04C 2230/91; F04C 2240/56; F04C 2/18
See application file for complete search history.

(56) References Cited

U.S. PATENT DOCUMENTS

| | | | |
|---|---|---|---|
| 3,953,160 A | 4/1976 | Bottoms | |
| 3,981,646 A | 9/1976 | Bottoms | |
| 4,233,005 A | 11/1980 | Bottoms et al. | |
| 4,308,153 A * | 12/1981 | Mori | ................... C10M 169/04 384/322 |
| 4,682,938 A | 7/1987 | Riordan | |

(Continued)

FOREIGN PATENT DOCUMENTS

| | | |
|---|---|---|
| EP | 0012328 A1 | 6/1980 |
| EP | 1722103 A2 | 11/2006 |

(Continued)

OTHER PUBLICATIONS

M. Gaumann, C. Bezencon, P. Canalis, W. Kurz, Single-Crystal Laser Deposition of Superalloys: Processing-Microstructure Maps, Acta Materialia, vol. 49, Iss. 6, Apr. 2, 2001, pp. 1051-1062.

(Continued)

*Primary Examiner* — Mary A Davis
(74) *Attorney, Agent, or Firm* — Locke Lord LLP; Scott D. Wofsy; Christopher J. Cillié

(57) ABSTRACT

A bearing carrier has a bearing body including a first material. The bearing body has an exterior surface defining a bridge land with a finger cut and rotatably supports a first and second gear. The first and second gears intermesh with one another for pressurizing fluid traversing the gears between a fluid inlet and a fluid outlet defined in a housing enveloping the bearing carrier. The bridge land is defined in a second material integral with the first material.

16 Claims, 7 Drawing Sheets

(56) References Cited

U.S. PATENT DOCUMENTS

| | | | |
|---|---|---|---|
| 5,190,450 A * | 3/1993 | Ghosh | F04C 2/086 |
| | | | 384/114 |
| 6,716,010 B2 * | 4/2004 | Eaton | F04C 2/18 |
| | | | 418/132 |
| 7,607,906 B2 | 10/2009 | Yates et al. | |
| 7,906,222 B2 * | 3/2011 | Nakamura | B22F 3/16 |
| | | | 419/12 |
| 8,137,085 B2 | 3/2012 | Ni et al. | |
| 8,672,657 B2 | 3/2014 | Masuda et al. | |
| 9,670,954 B2 * | 6/2017 | Turmeau | F16C 23/045 |
| 2007/0264148 A1 | 11/2007 | Yates et al. | |
| 2012/0141316 A1 | 6/2012 | Wakefield et al. | |
| 2013/0319153 A1 | 12/2013 | Ni | |

FOREIGN PATENT DOCUMENTS

| | | | | |
|---|---|---|---|---|
| GB | 2042083 A * | 9/1980 | | F04C 2/086 |
| GB | 2042083 A | 9/1980 | | |
| GB | 2116647 A | 9/1983 | | |

OTHER PUBLICATIONS

International Search Report from Intellectual Property Office dated Jul. 25, 2016 for Application No. GB1601139.1.

\* cited by examiner

BEARING FACES WITH FLUID CHANNELS FOR GEAR PUMPS

BACKGROUND OF THE INVENTION

1. Field of the Invention

The present disclosure relates to fluid pumping, and more particularly to fluid pumping devices for gas turbine engines.

2. Description of Related Art

Pumps are commonly used to pump and pressurize fluid in fluid distribution systems. Gas turbine engines, such as gas turbine engines for aircraft main engines or auxiliary power units, typically use gear pumps to provide fuel flow and pressure to gas turbine engines and other aircraft systems. Such pumps generally operate over a relatively large rotational speed operating range to provide critical fuel flow and pressures for various functions. One example of a fuel gear pump is a dual stage pump including a drive gear and a driven gear. The drive gear is typically fixed to a drive shaft, which receives rotational power from an accessory gearbox. The driven gear is generally intermeshed with the drive gear such that the teeth of the drive gear intermesh with the teeth of the driven. Each stage of the gear pump is disposed within a housing with an inlet and outlet and is supported by bearings with a bearing face. The bearing face provides a contour that receives pressurized fuel from the intermeshed gears and directs the pressurize fuel to the housing outlet, and to maintain proper function, pump assemblies including bearing surfaces can be periodically replaced.

Such conventional methods and systems have generally been considered satisfactory for their intended purpose. However, there is a need in the art for improved gear pumps and methods of reconditioning the bearing faces of such gear pumps. The present disclosure provides a solution to these needs.

SUMMARY OF THE INVENTION

A bearing carrier has a bearing body including a first material. The bearing body has an exterior surface defining a bridge land with a finger cut and rotatably supports a first and second gear. The first and second gears intermesh with one another for pressurizing fluid traversing the gears between a fluid inlet and a fluid outlet defined in a housing enveloping the bearing carrier. The bridge land is defined in a second material integral with the first material.

In certain embodiments the second material can be different material than the first material. The second material can have different physical properties than the first material. Wear characteristics of the second material can be better than wear characteristics of the first material. For example, the second material can have a greater ultimate stress or yield stress than the first material. Alternatively (or additionally), the second material can have a greater thermal coefficient of expansion or melting point than the first material. The second material can have a density that is greater than or less than the density of the first material. It is also contemplated that the galvanic potential of the first material can be similar to the galvanic potential of the second material, such as within about 0 to 0.4 volts of one another.

In accordance with certain embodiments the second material can be cladded to the first material, such as through a laser cladding process. The first material can include a copper alloy, e.g. brass or bronze, and the second material can include monel, steel, aluminum bronze, nickel aluminum bronze, or titanium by way of non-limiting example. Examples of suitable steels include stainless steel, carbon steel, or any suitable steel alloy. In certain embodiments, the second material has substantially the same density and thermal coefficient of expansion as the first material, and has superior mechanical properties including erosion resistance.

It is also contemplated that in certain embodiments the bearing body can have a 'figure 8' shape, and the bridge land can be disposed in the center of the 'figure 8'. The bearing body can define first and second shaft-receiving apertures, and the bridge land can be defined between the shaft-receiving apertures. The bearing body can be one of two bearing bodies incorporated into a gear pump assembly housing, a first shaft being rotatably supported in a first shaft aperture of each bearing body and a second shaft being rotatably supported in a second shaft aperture of each bearing body. A first gear can be mounted to the first shaft, and a second gear can be mounted to the second shaft such that rotation of the first and second gears drive fluid across the bridge land surfaces of the first and second bearing bodies.

A method of fabricating a bearing carrier as described above includes defining a near-net shape bridge land contour in the bearing carrier. The bearing carrier includes a second material coupled to a first material, and the near-net shape bridge land contour is defined in the second material.

In embodiments, the second material is integrally coupled to the first material using a laser cladding process. The method can also include removing a portion of the first material prior to adding material by coupling, e.g. depositing, the second material over the first material with the laser cladding process. Prior to removing the portion of the first material, the first material surface can be scanned to determine the amount of the first material to be removed. The first material surface can also be scanned prior to adding the second material to the first material to determine the amount material to be added using the laser cladding process.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
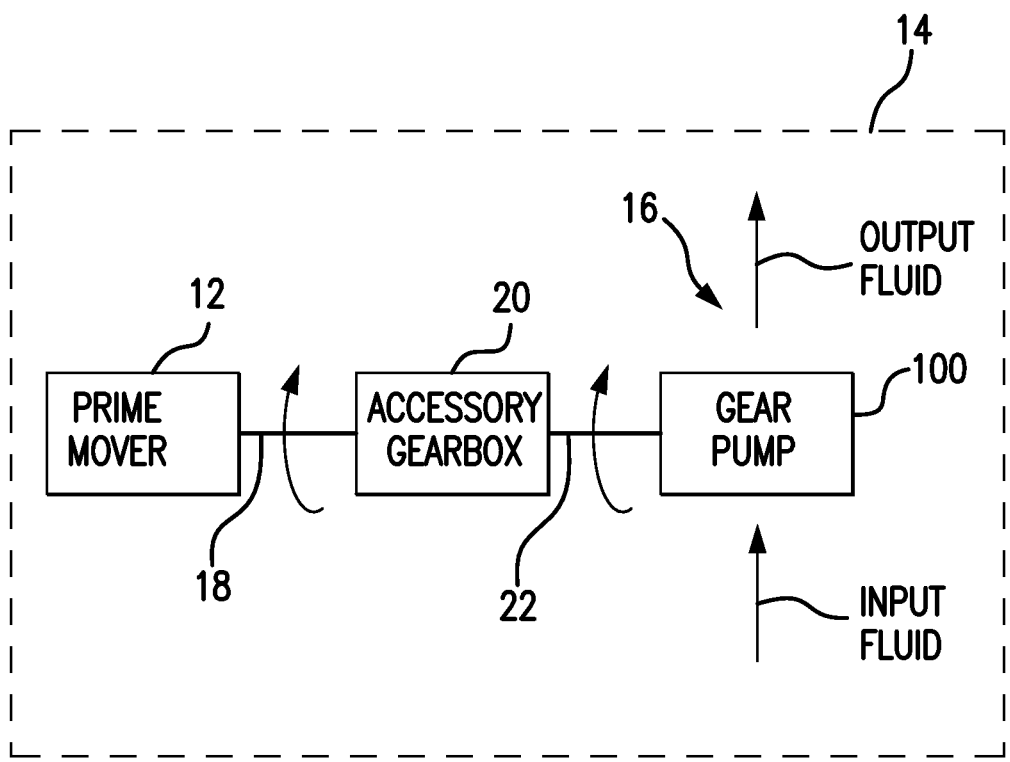
FIG. 1 is a schematic view of an exemplary embodiment of a fluid distribution system constructed in accordance with the present disclosure, showing a gear pump.

Reference will now be made to the drawings wherein like reference numerals identify similar structural features or aspects of the subject disclosure. For purposes of explanation and illustration, and not limitation, a partial view of an exemplary embodiment of a gear pump in accordance with the disclosure is shown in FIG. 1 and is designated generally by reference character 100. Other embodiments of fuel gear pumps in accordance with the disclosure, or aspects thereof, are provided in FIGS. 2-7, as will be described. The systems and methods described herein can be used in gas turbine engines, such as aircraft main engines or auxiliary engines.

Gear pump 100 is operatively associated with a prime mover 12 of an aircraft 14 for pumping fluid through a fluid distribution system 16 incorporated within aircraft 14. Prime mover 12 may be a gas turbine engine, such as an aircraft main engine or auxiliary power unit, and is operatively associated with gear pump 100 through an accessory gearbox drive shaft 18. Main shaft 18 is connected to an accessory gearbox 20. Accessory gearbox 20 is connected to gear pump 100 through a pump drive shaft 22. Gear pump 100 is operatively associated with fluid distribution system for receiving input fluid at a first pressure and supplying the input fluid at a second pressure, the second pressure being greater than the first pressure. Fluid distribution system 16 may be a fuel system, a hydraulic system, fueldraulic system, lubrication system, or other suitable fluid distribution system.

Figure 2:
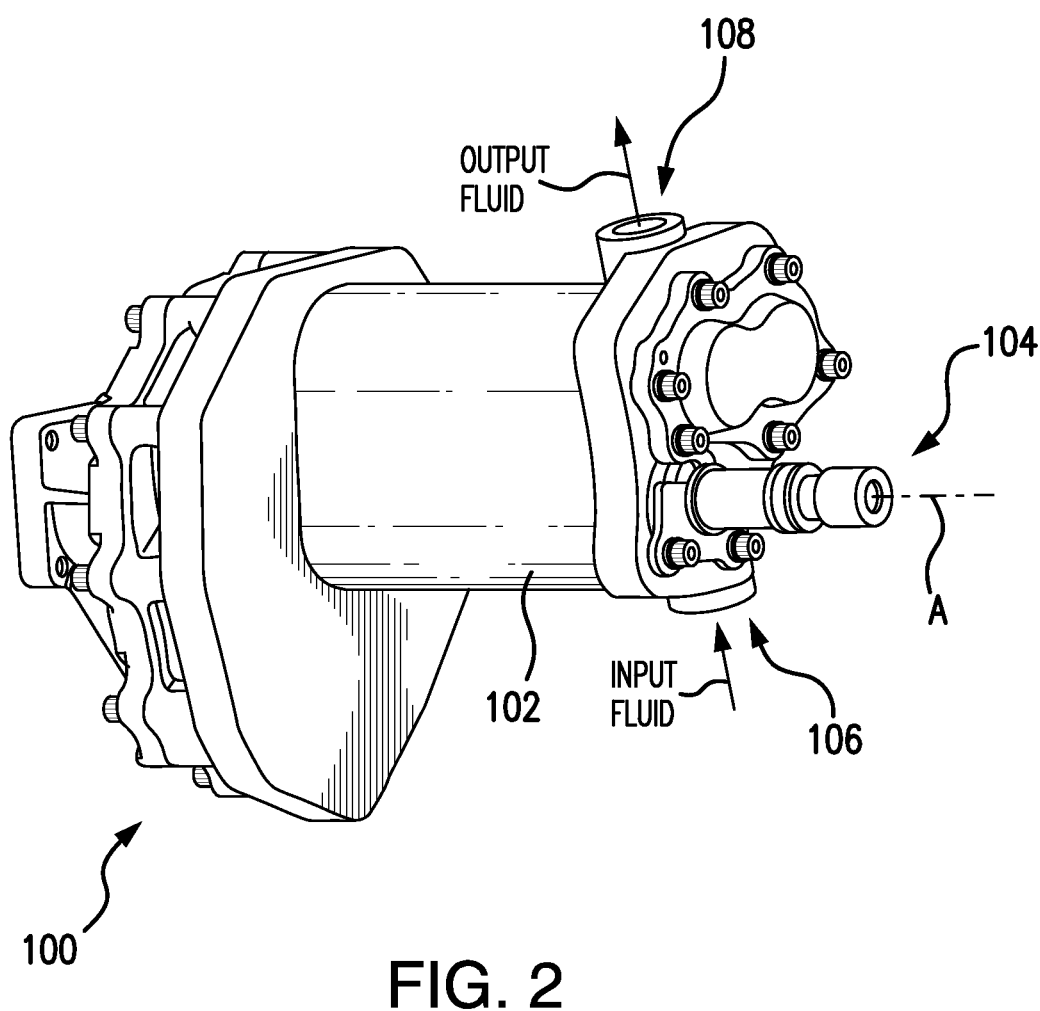
FIG. 2 is a perspective view of the gear pump of FIG. 1, showing the pump housing, inlet and outlet.

With reference to FIG. 2, an exterior of gear pump 100 is shown. Gear pump 100 includes a housing 102. Housing 102 receives an input shaft 104 and defines a fluid inlet 106 and a fluid outlet 108. Rotation of input shaft 104 drives drive and driven gears (shown in FIG. 3) disposed within housing 102 such that fluid entering fluid inlet 106 is pressurized and provided at fluid outlet 108.

Figure 3:
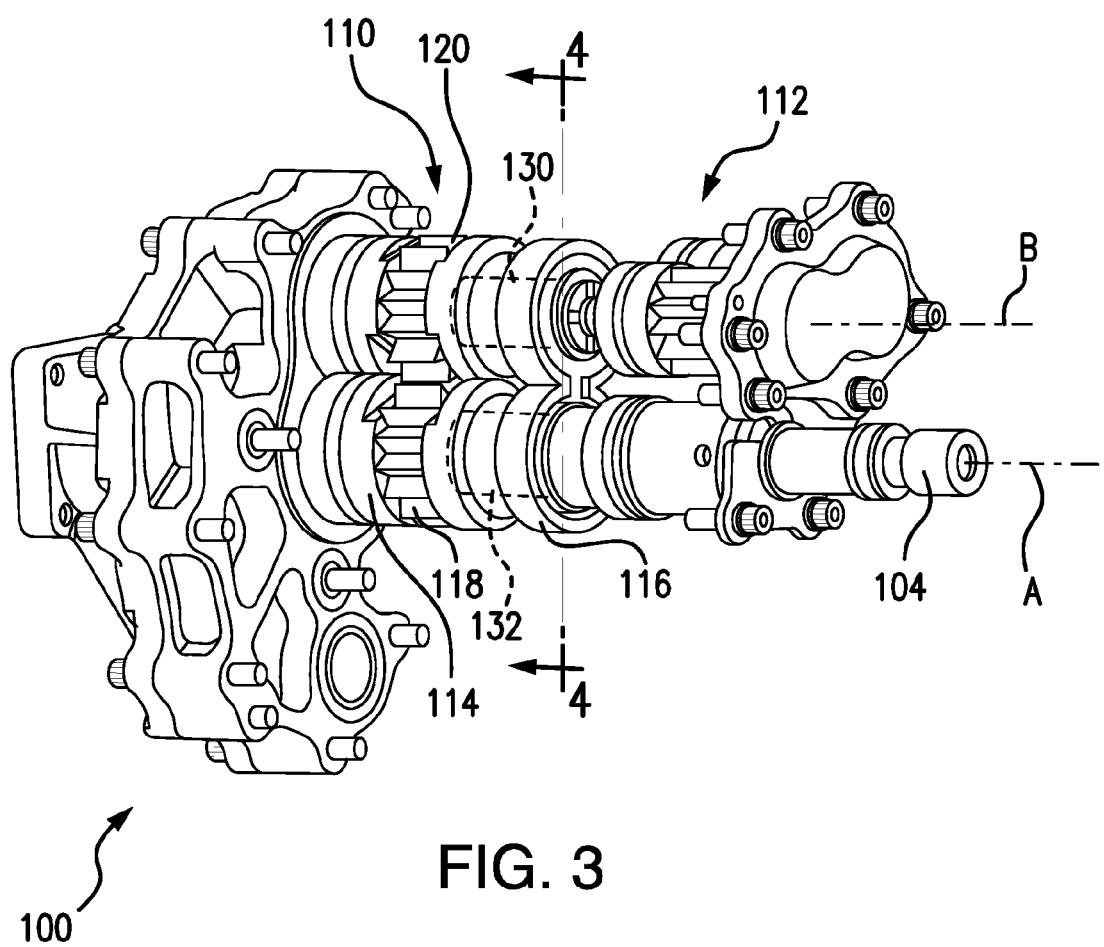
FIG. 3 is a perspective view of the gear pump of FIG. 1, showing opposed bearing carriers having seated therein first and second shafts with respective drive and driven gears.

With reference to FIG. 3, an interior of gear pump 100 is shown. Gear pump 100 includes a first stage 110 and a second stage 112 serially arranged in relation to one another along a first rotation axis A and a second rotation axis B. First stage 110 includes a first bearing carrier 114, a second bearing carrier 116, a first gear 120, and a second gear 118. First bearing carrier 114 defines a first shaft-receiving aperture 122 (shown in FIG. 4) and a second shaft-receiving aperture 124 (shown in FIG. 4). First gear 120 is fixed to first shaft 130 and extends along rotation axis B as an assembly. First shaft 130 is rotatably supported in both first shaft-receiving aperture 122 and first shaft-receiving aperture 126 (shown in FIG. 5). Second gear 118 is fixed to second shaft 132 and extends along rotation axis A. Second shaft 132 is rotatably supported in both second shaft-receiving aperture 124 and second shaft-receiving aperture 128 (shown in FIG. 5) such that second shaft 132 is parallel with first shaft 130 and teeth of first gear 120 are intermeshed with teeth of second gear 118.

Input shaft 104 is coupled to second shaft 132 for rotating second shaft 132. Rotation of second shaft 132 rotates second gear 118. As second gear 118 rotates, teeth of second gear 118 intermesh and rotate with teeth of first gear 120. This pumps fluid disposed between teeth of second gear 118, i.e. the drive gear, and first gear 120, i.e. the driven gear, as described in U.S. patent application Ser. No. 13/614,173, filed Sep. 13, 2014, the contents of which are incorporated herein in their entirety.

Figure 4:
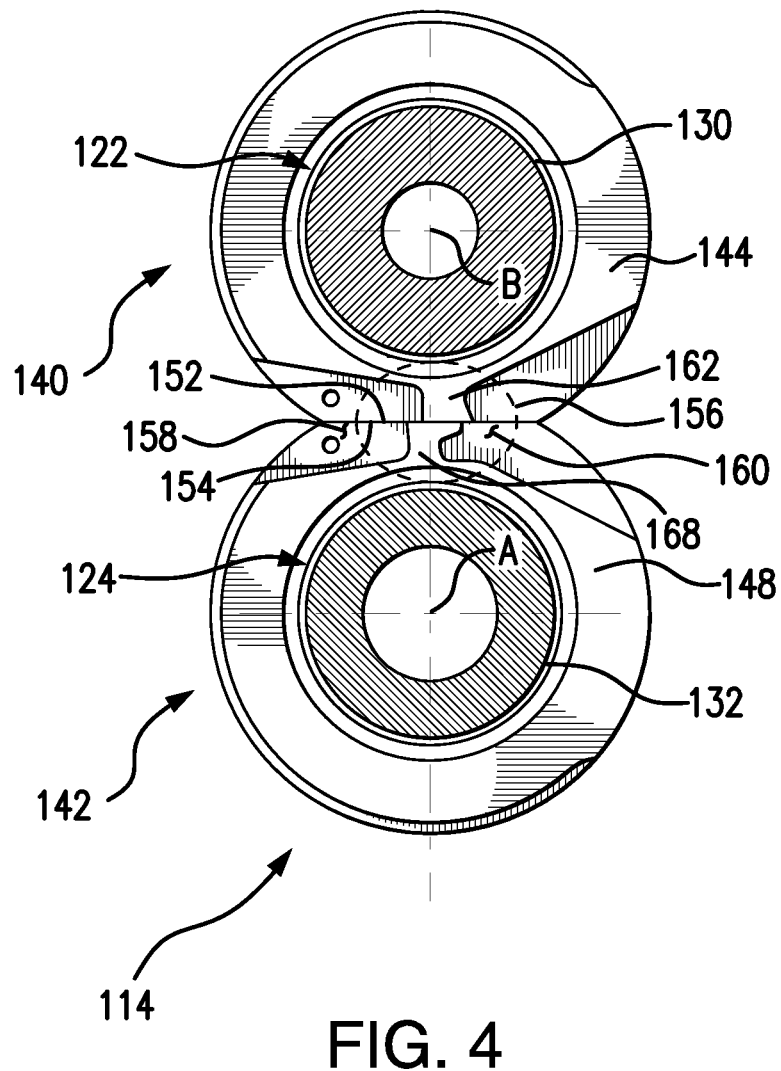
FIG. 4 is an end view of one of the bearing carriers of the gear pump of FIG. 1, showing shaft apertures and a bridge land defined by the exterior surface of the bearing carrier.

With reference to FIG. 4, first bearing carrier 114 is shown. First bearing carrier 114 is a cast body formed from a copper alloy, such as brass, bronze or other suitable material, and includes a first bearing body 140 and a second bearing body 142. First bearing body 140 is adjacent to second bearing body 142 and may be adjacent to one another or integrally joined to one another in a structure having a 'figure 8' axial profile, i.e. when viewed along rotation axis A or rotation axis B. A bearing face 144 of first bearing body 140 defines first shaft-receiving aperture 126 and mates to an axial end face of second bearing carrier 116 (shown in FIG. 3). First shaft 130 is rotatably supported within first shaft-receiving aperture 126. A bearing face 148 of second bearing body 142 defines second shaft-receiving aperture 128 and mates to a corresponding axial end of second bearing carrier 116 (shown in FIG. 3). Second shaft 132 is rotatably supported with second shaft-receiving aperture 128.

First bearing body 140 defines an edge 152 that is adjacent to an edge 154 of second bearing body 142. Adjacent of edge 152 and edge 154, both first bearing body 140 and second bearing body 142 define a bridge land 156 (circled in FIG. 4). Bridge land 156 includes an inlet channel 158 and an outlet channel 160 defined by adjacent portions first bearing body 140 and second bearing body 142. A finger 162 of first bearing body 140 and a finger 168 of second bearing body 142 separate inlet channel 158 from outlet channel 160. As first gear 120 (shown in FIG. 3) and second gear 118 (shown in FIG. 3), fluid is drawn from inlet channel 158 at a first pressure and into outlet channel 160 at a second pressure, the second pressure being higher than the first pressure.

Bridge land 156 facilitates fluid interchange at the gear mesh. Cavitation can occur when the local fluid pressure falls below the true vapor pressure of the fluid, allowing fluid bubbles to form and violently collapse back into solution. When cavitation occurs on or near a solid surface, the high intensity collapse force or cavitation damage power, similar to a shockwave, can cause high surface stresses and lead to local deterioration of the surface, potentially damaging the surface, such as through pitting. Cumulative pitting can erode the surface contour of bridge land 156, changing fluid handling, and changing performance of the gear pump. Pressure ripple, which is also caused by the fluid interchange at the gear mesh, increases and decreases the local fluid pressure, which can increase cavitation and may cause other detrimental effects to the system.

Figure 5:
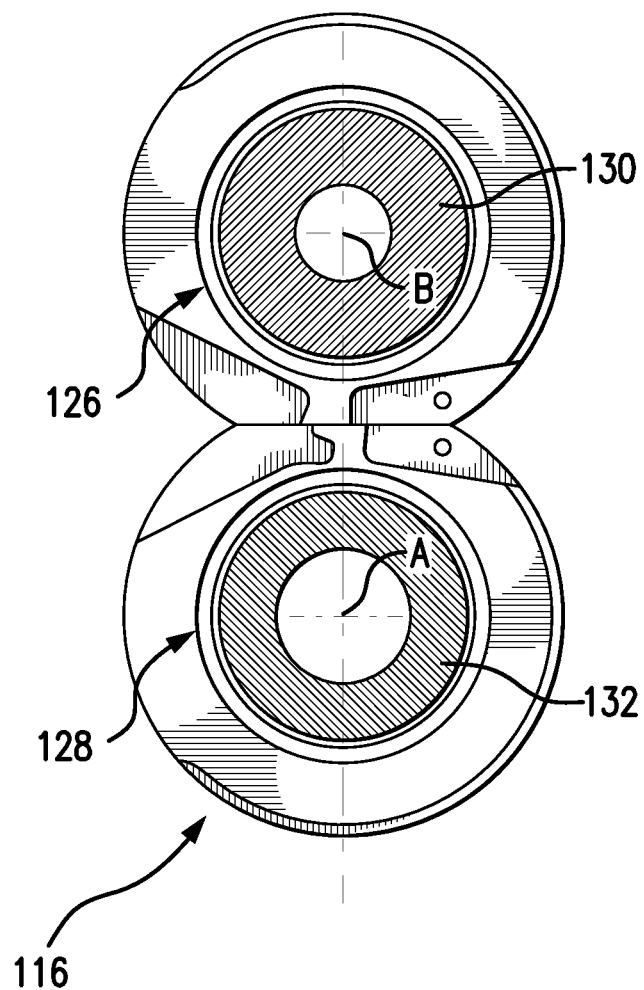
FIG. 5 is an end view of another of the bearing carriers of the gear pump of FIG. 1, showing shaft apertures and a bridge land defined by the exterior surface of the bearing carrier.

With reference to FIG. 5, second bearing carrier 116 is shown. Second bearing carrier 116 is similar to first bearing carrier 114, and additionally includes a surface contour that mirrors the surface contour of first bearing carrier 114. Second bearing carrier 116 defines shaft-receiving apertures, a first shaft-receiving aperture 126 of second bearing carrier 116 facing first shaft-receiving aperture 122 (shown in FIG. 4) of first bearing carrier 114, and a second shaft-receiving aperture 128 of second bearing carrier 116 facing second shaft-receiving aperture 124 (shown in FIG. 4) of first bearing carrier 114.

Figure 6:
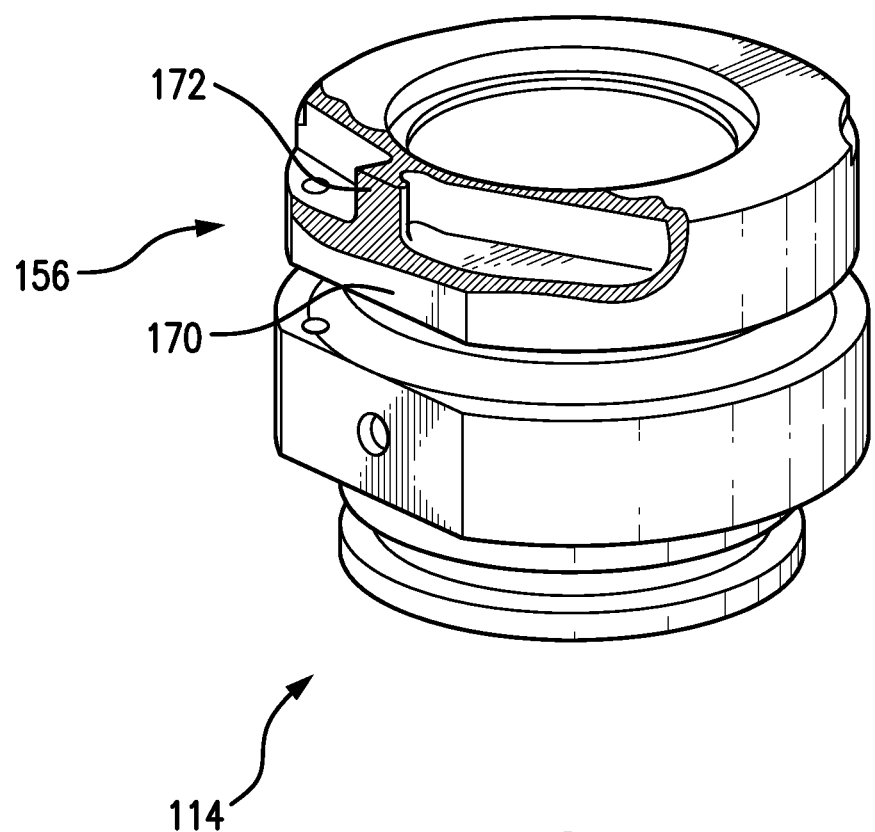
FIG. 6 is a perspective view of a portion of the bearing carrier of the gear pump of FIG. 1, showing a first material, a second material, and the bridge land defined in the second material.

With reference to FIG. 6, a portion of first bearing carrier 114 is shown. First bearing carrier 114 includes a first material 170 and second material 172. Second material 172 is integrally coupled to first material 170 and defines bridge land 156, and may be cladded to first material 170. First material 170 is a cast copper alloy, such as brass or bronze. Second material 172 may also be a copper alloy, and in certain embodiments includes the same material as included in first material 170. The bridge land is defined in a second material integral with the first material.

In embodiments, second material 172 may be a different material from first material 170. For example, in certain embodiments, second material has a greater ultimate stress or yield stress than first material 170. Second material 172 may have a greater thermal coefficient of expansion or melting point than first material 170. A density of second material 172 can be greater than or less than a density of first material 170. Examples of materials included in second material 172 are aluminum and aluminum alloys, monel, carbon or stainless steel, and titanium or titanium alloy. It is noted that monel can provide substantially the same coefficient of thermal expansion and density as the copper alloy forming first material 170 while providing improved mechanical stress. This can potentially render bridge land 156 more resistant to cavitation damage and/or erosion from cavitation.

In accordance with certain embodiments the second material can be cladded to the first material, such as through a laser cladding process. The first material can include a copper alloy, e.g. brass or bronze, and the second material can include monel, steel, or titanium. The steel can be a stainless steel, carbon steel, or other suitable steel alloy material. In an embodiment, the second material has substantially the same density and thermal coefficient of expansion as the first material, and has superior mechanical properties including erosion resistance. It is contemplated that second material 172 can have a galvanic potential that is similar than a galvanic potential of first material 170, e.g. the galvanic potential of second material 172 being within about 0 to 0.4 volts of first material 170. This can reduce or eliminate galvanic corrosion that could potentially develop between first and second material under certain conditions.

Figure 7:
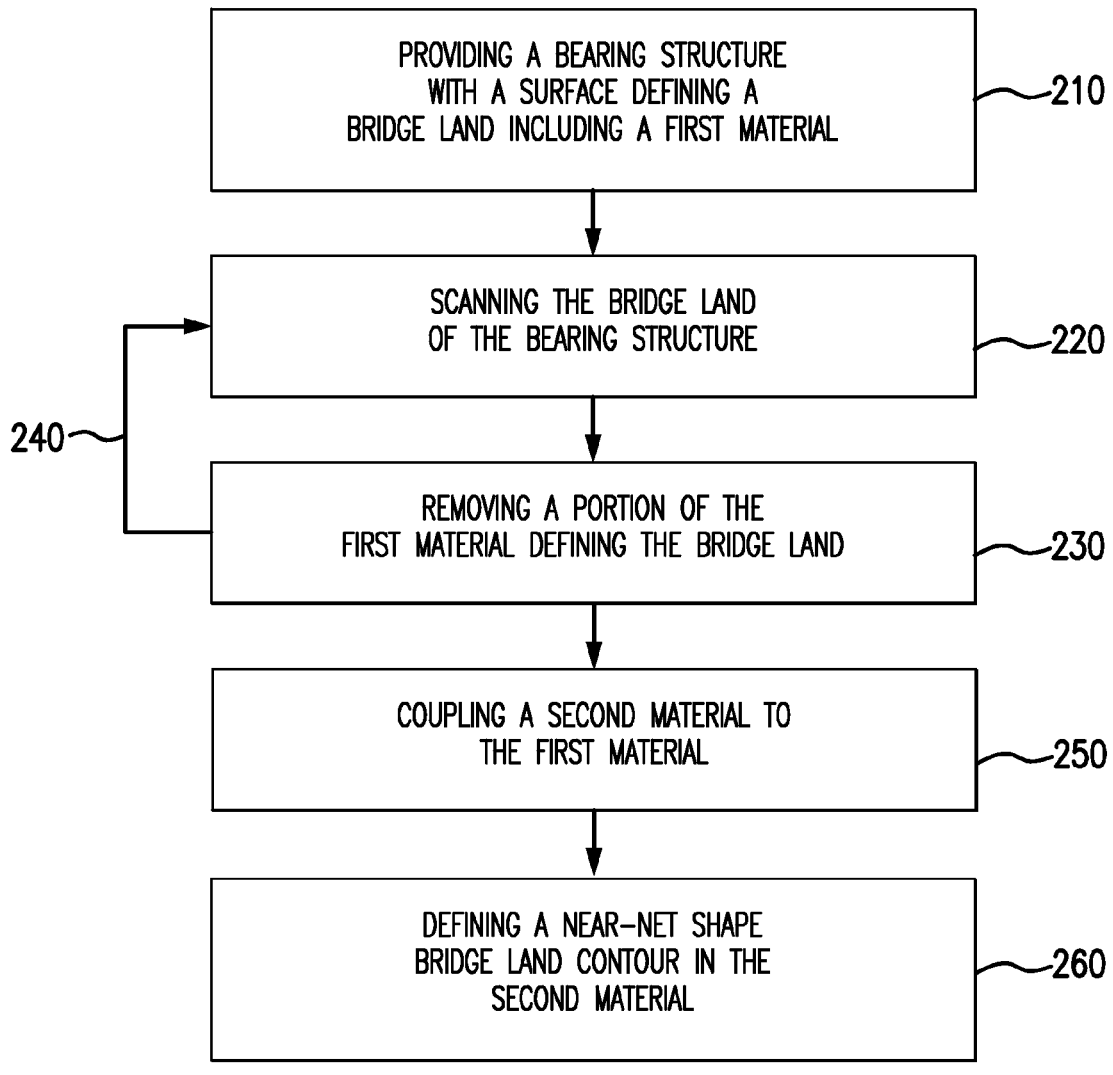
FIG. 7 is a diagram of a method of making a bearing carrier, showing operations of the method, according to embodiments.

With reference to FIG. 7, a method 200 of fabricating a bearing carrier, e.g. first bearing carrier 114, is shown. Method 200 includes providing a bearing carrier with a surface defining a bridge land, e.g. bridge land 156, formed from a first material, e.g. first material 170, as shown with box 210. The first material can be a copper alloy such as brass or bronze, and can be a cast body, and can include native material from a new bearing carrier or from a bearing carrier previously used in a pump assembly. Method 200 also includes scanning the bridge land, as shown with a box 220. The scanning process can provide information for determining how much of the first material need be removed from the bearing carrier. It can also be for purposes of determining how much of a second material, e.g. second material 172, need be added to the bearing carrier. As indicated with arrow 240, the scanning process can be iterative.

Method 200 also includes removing a portion of the first material defining the bridge land, as indicated by box 230. This can expose a native portion of the first material that may more readily integrate with the second material. Method 200 further includes coupling a second material to the first material, as indicated by a box 250. The coupling process may include a cladding process, such as a laser cladding process, to form a near-net shape. The near-net shape formed by the cladding process can closely, though not necessarily precisely, resemble the intended final contour of bridge land. Method 200 further includes defining a bridge land contour in the second material, as shown by box 260. This provides a fluid handing surface with the fluid handling properties similar to the original copper alloy bridge land but with the resistance to pitting and/or erosion that is characteristic of the second material cladded to the first material.

Although particular operation sequences are shown, described, and claimed, it should be understood that operations may be performed in any order, separated or combined unless otherwise indicated and will still benefit from the present disclosure.

In embodiments, bearing carriers having a second material integrally coupled to a first material can provide a robust, relatively compact, lightweight additive insert to the bridge land of the main drive gear bearings. In certain embodiments, fuel gear pumps incorporating such bearing carriers can provide improved fuel pump operability in aircraft fuel systems, operability, and safety. It is also contemplate that, in embodiments, a second material defining the bridge material and coupled to the first material, can provide reduced cavitation and pressure ripple in the fuel system over a range of operating speeds and fuel temperatures. This will reduce deterioration of the gears, bearings, housings, and other system components, thus maintaining pump and system performance and increasing component operating life. The minimized pressure ripple and cavitation damage power intensity will create a more stable fuel system that can be more easily and accurately monitored and controlled.

The methods and systems of the present disclosure, as described above and shown in the drawings, provide for gear pumps with superior properties including improved erosion resistance. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A bearing carrier, comprising:
   a bearing body of a first material having a shaft-receiving aperture and a bridge land with a finger cut to channel fluid pressurized by intermeshing of gears rotatably supported by the bearing carrier into an outlet defined by a housing enveloping the bearing carrier,
   wherein the bridge land includes a second material integral with the first material,
   wherein the first material and the second material define an exterior surface of the bearing body extending about the shaft-receiving aperture, wherein the second material extends only partially about the shaft-receiving aperture.

2. The bearing carrier as recited in claim 1, wherein the first material is different from the second material.

3. The bearing carrier as recited in claim 1, wherein the second material has a greater ultimate stress than an ultimate stress of the first material.

4. The bearing carrier as recited in claim 1, wherein the second material has a greater yield stress than a yield stress of the first material.

5. The bearing carrier as recited in claim 1, wherein the second material has a thermal coefficient of expansion that is less than a thermal coefficient of expansion of the first material.

6. The bearing carrier as recited in claim 1, wherein the second material has a melting point that is greater than a melting point of the first material.

7. The bearing carrier as recited in claim 1, wherein a density of the second material is less than a density of the first material.

8. The bearing carrier as recited in claim 1, wherein a galvanic potential of the second material is similar to a galvanic potential of the first material.

9. The bearing carrier as recited in claim 1, wherein the first material comprises a copper alloy and the second material comprises monel, steel, or titanium.

10. The bearing carrier as recited in claim 1, wherein the second material is cladded to the first material.

11. The bearing carrier as recited in claim 1, wherein the shaft-receiving aperture is a first shaft-receiving aperture and the bearing carrier defines a second shaft-receiving aperture, wherein the bridge land is defined between the first shaft-receiving aperture and the second shaft-receiving aperture.

12. A pump, comprising:
the bearing carrier as recited in claim 1, wherein the shaft-receiving aperture is a first shaft-receiving aperture and the bearing carrier defines a second shaft-receiving aperture;
a first shaft rotatably supported in the first shaft-receiving aperture;
a second shaft parallel with the first shaft and seated in the second shaft-receiving aperture;
a first gear mounted to the first shaft; and
a second gear mounted to the second shaft and intermeshed with the first gear, wherein the bridge land of the bearing body faces the intermeshed gears such that intermeshing of the gears pressurizes and drives fluid across the bridge land and across channels defined in an exterior surface of the bearing carrier.

13. A method of fabricating a bearing carrier, comprising:
at a bearing body formed from a native first material having a shaft-receiving aperture and a bridge land with a finger cut to channel fluid pressurized by intermeshing of gears rotatably supported by the bearing carrier into an outlet defined by a housing enveloping the bearing carrier,
wherein the bridge land includes a second material integral with the first material, the first material underlying the second material,
wherein the first material and the second material define an exterior surface of the bearing body extending about the shaft-receiving aperture, wherein the second material extends only partially about the shaft-receiving aperture;
defining a near net shape contour of the bridge land in a surface of the second material.

14. The method as recited in claim 13, further including coupling the second material to the first material using a laser cladding process.

15. The method as recited in claim 14, further including scanning a surface of the first material prior to coupling the second material to the first material using the laser cladding process.

16. The method as recited in claim 13, further including removing a portion of the first material prior to coupling the second material to the first material using the laser cladding process.

* * * * *